United States Patent [19]

Schoofs

[11] Patent Number: 5,055,994
[45] Date of Patent: Oct. 8, 1991

[54] A.C. TO D.C. CONVERTER

[75] Inventor: Franciscus A. C. M. Schoofs, Eindhoven, Netherlands

[73] Assignee: U. S. Philips Corporation, New York, N.Y.

[21] Appl. No.: 526,854

[22] Filed: May 21, 1990

[30] Foreign Application Priority Data

May 22, 1989 [GB] United Kingdom ............... 8911755
Jun. 16, 1989 [GB] United Kingdom ............... 8913902

[51] Int. Cl.$^5$ .......................................... H02M 7/217
[52] U.S. Cl. ...................................... 363/127; 363/89; 307/261
[58] Field of Search ............... 363/125, 127, 89; 328/26, 28, 31–32; 307/261, 262

[56] References Cited

U.S. PATENT DOCUMENTS

| 4,347,561 | 8/1982 | McLellan | 363/127 |
| 4,685,046 | 8/1987 | Sanders | 363/89 |
| 4,811,191 | 3/1989 | Miller | 307/261 |

FOREIGN PATENT DOCUMENTS 3245238  6/1984  Fed. Rep. of Germany ...... 363/127

Primary Examiner—Peter S. Wong
Attorney, Agent, or Firm—Bernard Franzblau

[57] ABSTRACT

An a.c. to low voltage d.c. converter includes a pair of input voltage supply lines (Vin,OV) and a semiconductor switch element (T1) and a capacitor (C1) connected in series between the supply lines. An output (Vo) for d.c. voltage is provided across the capacitor (C1). A sensing circuit (10) is responsive to the input voltage and is arranged to trigger the switching element (T1) to conduct only during a portion of the a.c. voltage below a predetermined voltage.

13 Claims, 2 Drawing Sheets

A.C. TO D.C. CONVERTER

BACKGROUND OF THE INVENTION

This invention relates to a converter for producing a low voltage d.c. from a source of a.c. and more particularly but not solely to a converter for producing a low voltage d.c. from the a.c. supply voltage.

There are many applications where a d.c. voltage is required to be provided from an a.c. source, for example, in semiconductor circuits driven from an a.c. mains source. There are various known ways of carrying out such a conversion, for example the a.c. mains voltage may be transformed to a lower a.c. voltage by means of a transformer feeding a rectifier. This is a bulky arrangement and even if a separate winding can be employed in equipment having an existing transformer it is not always a convenient method. Another possibility is to rectify the mains voltage and reduce the high voltage d.c. so produced by means of a series voltage dropping element, e.g. a resistor or a transistor. However, such an arrangement requires a high power dissipation in the series element even if the low voltage source is required to provide a moderate supply current. Another possibility is to employ series capacitors in the a.c. supply line feeding a rectifier bridge, which is again a bulky solution.

The present invention has resulted from a consideration of the above mentioned disadvantages and seeks to provide a solution suitable for implementation in integrated circuit form.

SUMMARY OF THE INVENTION

According to the invention there is provided an a.c. to low voltage d.c. converter comprising a pair of input voltage supply lines, a semiconductor switch element and a capacitor connected in series between the supply lines, in which an output for d.c. voltage is provided across the capacitor, wherein a sensing circuit is provided which is responsive to the input voltage for triggering the switching element to conduct only during a portion of the a.c. voltage below a predetermined voltage.

The switching element may comprise a field effect transistor.

In the series connection of the switch element and capacitor there may be provided a diode connected between one of the supply lines and the switch element. Alternatively, a diode may be connected between the switch element and the capacitor.

In one advantageous arrangement employing the aforesaid series arrangement, the sensing circuit comprises a resistor, connected to one of the input supply lines, and connected in series with a diode and a parallel arrangement of a capacitor and zener diode to the d.c. output. A second field effect transistor has its gate connected to the junction of the resistor and the diode, its source connected to the other side of the diode and its drain connected to the gate of the switching element and to the collector of a junction transistor. The emitter of the junction transistor is connected via a zener diode to the other one of the input supply lines and the base of which is connected to the output. A (zener) diode is provided with its anode connected to the other of the input lines and its cathode connected to the terminal of the resistor which is not connected to one of the input lines.

In another advantageous arrangement employing the immediately preceding series connection, the sensing circuit comprises a first resistor, connected to one of the input supply lines, and connected in series with a first zener diode which is connected to the gate of a second field effect transistor (T3). The source of the second field effect transistor is connected to a capacitor connected in parallel with the series arrangement of a second zener diode and a second resistor which is in turn connected to the output. The source and gate of the second field effect transistor is bridged by a third zener diode and its drain is connected via a diode to the collector of a junction transistor the emitter of which is connected to the other of the input supply lines via a fourth zener diode and the base of which is connected to the output. A second junction transistor is provided having its base connected to the junction of the second zener diode and the second resistor, its emitter connected to the output and its collector connected to the gate of the switching element.

A rectifier may be provided between a source of a.c. supply and the pair of input voltage supply lines. Furthermore, a transformer may be provided in between the source of a.c. supply and the rectifier.

BRIEF DESCRIPTION OF THE DRAWINGS

In order that the invention and its various other advantages and features may be understood more easily, some embodiments thereof will now be described, by way of example only, with reference to the accompanying drawings, in which.

DESCRIPTION OF THE PREFERRED EMBODIMENTS

Figure 1:
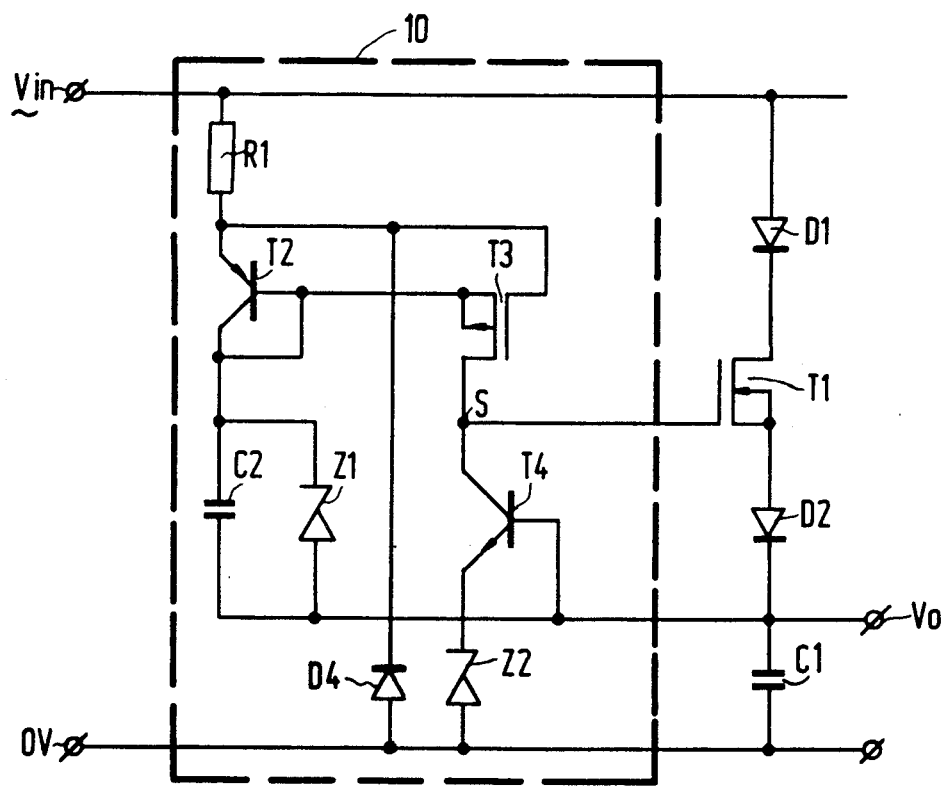
FIG. 1 is a circuit diagram of an a.c. to d.c. converter constructed in accordance with the invention but without voltage protection.

The construction of FIG. 1 comprises a field effect switching transistor T1 which is connected to an a.c. mains source, e.g. 230 V.RMS, via a diode. There are two alternative connections illustrated in the drawing, in one the drain of the switching transistor T1 may be connected to an a.c. mains voltage source Vin via a diode D1, or in a second alternative the source of the switching transistor T1 may be connected via a diode D2 in series with a capacitor C1 of 100 micro Farad to the neutral or zero voltage line 0V. The terminal of capacitor C1 that is not connected to the 0V line forms a d.c. output terminal Vo of the circuit. Diodes D1 and D2 indicate two possible positions of a blocking diode, of which only one is required if the input voltage of the system becomes lower than the voltage across C1. A sensing circuit 10 drives the switching transistor T1 and comprises a pnp transistor T2, the emitter of which is coupled to the input line Vin via a high resistance (3M.Ohm) resistor R1 and also to the gate of a field effect transistor T3. A diode D4 is connected between the resistor R1/emitter junction and the 0V line to permit operation directly from an AC source. Otherwise, a rectifier is required in front of the circuit if a high (230V.RMS) source is used. The collector and base of the transistor T2 are connected together so that transistor T2 functions as a diode. The collector/base junction is connected via a parallel connection of a capacitor C2 of 20 pF and a zener diode Z1 of 22 volts to the output Vo. The source of the transistor T3 is connected to the base of T2 and the drain of T3 is connected to the collector of an npn transistor T4, the emitter of which is connected to the 0V line via a zener diode Z2 of 15 volts. The base of T4 is connected to the output Vo. The diode D4 is connected between 0 Volt and the terminal of R1 which is not connected to Vin in order to provide a protective clamp if the input voltage becomes negative.

When the circuit is first switched on the capacitor C2 is charged through transistor T2 to 22 volts as defined by zener diode Z1, the current being limited by resistor R1. Transistors T3 and T1 are initially off. When the voltage Vin falls below 20 volts+Vo, T3 conducts (ON) and the charge from capacitor C2 is applied across the gate/source capacitance of transistor T1 and the series diode D2 thereby turning transistor T1 ON. The capacitor C1 receives charging current from the supply line Vin until the voltage Vin falls below the output voltage Vo, whereupon conduction ceases and D2 blocks. When the voltage waveform Vin rises again above the voltage Vo with transistor T1 still being ON, the transistor starts to pass current again and capacitor C1 charges until its voltage rises to 15V plus one transistor junction voltage whereupon transistor T4 conducts, transistor T1 is switched off and capacitor C2 recharges, and the cycle repeats again. In this way the transistor conducts only during the low voltage portions of the input waveform and during this short period a peak current flows that has an average value equal to the load current of the low voltage supply. For a small current demand of say 10mA, this may be acceptable, especially when the circuit is only effective during start up of a system. The circuit may be fed directly from an a.c. supply or from a bridge rectifier fed from an a.c. supply and thus avoids any waste of power which occurs in prior art circuits that use a resistor in series with the transistor T1 and capacitor C1.

The circuit of FIG. 1 functions satisfactorily provided transistor T1 can cope with a relatively large dissipation which occurs initially at switch-on and can also tolerate transients which also occur on a.c. mains supplies. However, in order to overcome the problem of switch-on and transient occurence and permit the use of a lower rated transistor, there are several refinements of the invention which are possible, as will now be described in connection with FIG. 2. The same reference numerals have been used in these drawings for components similar to those in FIG. 1.

Figure 2:
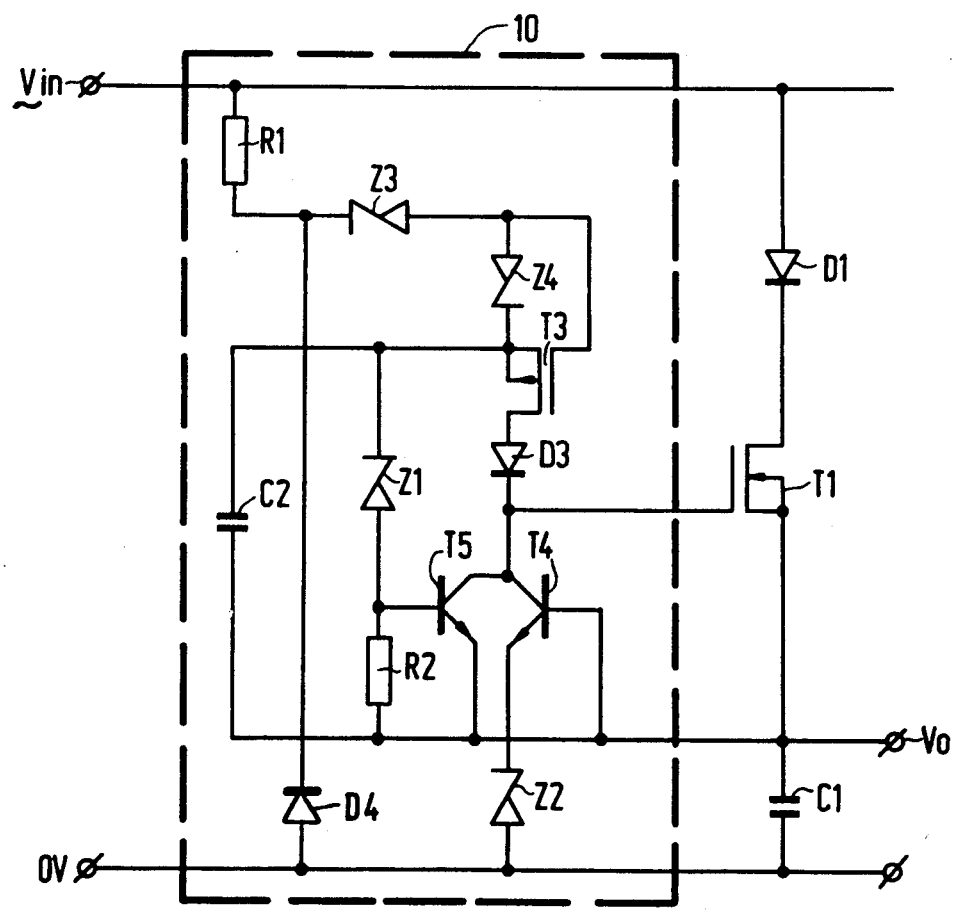
FIG. 2 is a circuit diagram of an alternative embodiment of an a.c. to d.c. converter constructed in accordance with the invention and incorporating voltage protection.

Referring now to FIG. 2, it will be seen that transistor T2 has been omitted, a zener diode Z3 of 22 volts has been introduced in series between the resistor R1 and transistor T3 and a further zener diode Z4 has been connected between the gate and source of T3. The diode D2 has been omitted and a diode D3 was inserted in the drain line of transistor T3. The zener diode Z1 of 22 volt is now connected in series with a resistor R2 between the source of T3 and the output Vo. An npn transistor T5 has its base connected to the junction of R2 and Z1, its emitter connected to the output VO and its collector connected to the collector of transistor T4. This circuit operates as follows, starting from a steady state condition where the input voltage is higher than the output voltage. Transistor T1 is off (initial status).

Capacitor C2 is charged to 22 volts as defined by zener diode Z1. Transistor T5 conducts and holds T1 off. If now Vin decreases to 20 volts +Vo, transistor T3 becomes conductive, the gate/source capacitance CGS of T1 is charged from capacitor C2 via transistor T3 and diode D3 switching on transistor T1 so that capacitor C1 is charged via D1 and T1 from Vin. When the input voltage becomes lower than Vo, capacitor C1 will no longer charge but transistor T1 will be held ON. Next time the input voltage rises above 15 volts, capacitor C1 will be charged again until it rises to 15 volts plus one junction voltage drop, whereupon transistor T4 will be switched on. If Vin is 0 volts, capacitor C2 is discharged via the protection zener diode Z4, Z3 and R1 to 22 volts. Discharge of the gate/source capacitance of transistor T1 is prevented by diode D3.

When starting up the circuit of FIG. 2, Vo=0, T1 is switched off as soon as the path R1, Z3, Z4, Z1, R2 is conductive. Maximum voltage during turn on (T1 ON) is determined by zener diodes Z3 and Z1. This construction produces low dissipation in the transistor T1 and facilitates integration on a chip.

Figure 3:
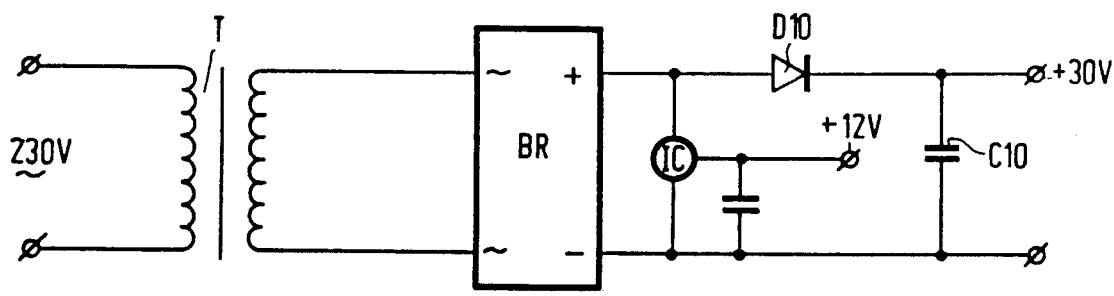
FIG. 3 is an a.c. to d.c. converter constructed in accordance with the invention but employing a transformer.

The schematic diagram of FIG. 3 shows a mains source of 230 volts feeding a transformer T which steps down the voltage and feeds a bridge rectifier BR, the output of which at 30 volts d.c. is fed to a capacitor C10 via a diode D10 to provide one source of d.c. supply voltage. The rectified voltage is also used to feed an integrated circuit converter IC as described in connection with FIGS. 1 or 2 to provide a 12 volt output. The output voltage of 12 volts can be realized by choosing the appropriate stack of Zener diodes and normal diodes. It is to be understood that the specific values mentioned above are only used as an example for explaining the operation of the system.

Although the circuit has been described employing transistors of particular conductivity types, it will be appreciated that the opposite conductivity type can be employed without departing from the scope of this invention. The circuits are preferably provided by integration on a single integrated circuit chip and can easily be integrated with other circuitry.

I claim:

1. An a.c. voltage to low voltage d.c. converter comprising: a pair of input AC voltage supply lines, a semiconductor switch element and a capacitor connected in a substantially resistance free series circuit between the supply lines, first and second output terminals for d.c. output voltage coupled across the capacitor, and a sensing circuit responsive to the input voltage and to the output voltage for triggering the switch element to conduct only during a portion of the a.c. voltage below a predetermined voltage.

2. A converter as claimed in claim 1, wherein the semiconductor switch element comprises a field effect transistor.

3. An a.c. voltage to low voltage d.c. converter comprising: a pair of input AC voltage supply lines, a semiconductor switch element and a capacitor connected in series circuit between the supply lines, first and second output terminals for d.c. output voltage coupled across the capacitor, and a sensing circuit responsive to the input voltage and to the output voltage for triggering the switch element to conduct only during a portion of the a.c. voltage below a predetermined voltage, wherein the sensing circuit comprises; a resistor connected to one of the input supply lines and in series with a diode and a parallel arrangement of a second capacitor and a first zener diode to the first output terminal, a transistor having a control electrode connected to a junction of the resistor and the diode, means coupling said transistor between the second capacitor and a control electrode of the switch element, means coupling a collector of a second transistor to said control electrode of the switch element, means connecting an emitter of said second transistor via a second zener diode to the other one of the input supply lines and a base of the second transistor to the first output terminal, and a further diode having an anode connected to the other one of the input lines and a cathode connected via the resistor to said one of the input lines.

4. A converter as claimed in claim 1 wherein a rectifier is coupled between a source of a.c. supply and the pair of input voltage supply lines.

5. A converter as claimed in claim 4, further comprising a transformer connected between the source of a.c. supply and the rectifier.

6. An a.c. voltage to low voltage d.c. converter comprising: a pair of input AC voltage supply lines, a semiconductor switch element and a capacitor connected in series circuit between the supply lines, wherein said switch element is non-conductive during one half cycle of the AC voltage, first and second output terminals for d.c. output voltage coupled across the capacitor, a sensing circuit responsive to the input voltage and to the output voltage for triggering the switch element to conductor only during a portion of the a.c. voltage below a predetermined voltage, and a diode and a resistor connected in a series arrangement across the AC input supply lines and with the diode polarized to conduct during said one half cycle of the AC voltage.

a diode and a resistor connected in a series arrangement across the AC input supply lines and with the diode polarized to conduct during said one half cycle of the AC voltage.

7. A converter as claimed in claim 1 wherein the sensing circuit further comprises a control transistor coupled between a control electrode of the switch element and one of said input supply lines and having a control electrode coupled to said first output terminal whereby the DC output voltage at least partly controls operation of the control transistor.

8. A converter as claimed in claim 7 further comprising a voltage-dependent switching element connected in series with the control transistor between the control electrode of the switch element and said one input supply line.

9. An a.c. voltage to low voltage d.c. converter comprising: a pair of input AC voltage supply lines, a semiconductor switch element and a capacitor connected in series circuit between the supply lines, first and second output terminals for d.c. output voltage coupled across the capacitor, and a sensing circuit responsive to the input voltage and to the output voltage for triggering the switch element to conduct only during a portion of the a.c. voltage below a predetermined voltage, wherein the sensing circuit comprises:

a resistor and a second capacitor connected in a series circuit between one input supply line and the first output terminal, and a second semiconductor switch coupling the second capacitor to a control electrode of the switch element and having a control electrode coupled to said one input supply line.

10. A converter as claimed in claim 9 wherein the sensing circuit further comprises:

a voltage-regulating element connected in parallel with the second capacitor.

11. A converter as claimed in claim 10 wherein the sensing circuit further comprises:

a voltage-dependent switching element connected in series circuit with and between said resistor and said second capacitor.

12. A stepdown voltage AC/DC converter comprising: a pair of input voltage supply lines, a semiconductor switch element and a capacitor connected in series circuit between the supply lines, an output for d.c. voltage coupled across the capacitor, and a sensing circuit responsive to the input voltage for triggering the switch element to conduct only during a portion of the a.c. voltage below a predetermined voltage, wherein the sensing circuit comprises; a resistor connected to one input supply line and in series with a diode and a parallel arrangement of a second capacitor and a first zener diode to the output, a first transistor having a control electrode connected to a junction of the resistor and the diode, means coupling said transistor between the second capacitor and a control electrode of the switch element, means coupling a collector of a second transistor to said control electrode of the switch element, means connecting an emitter of said second transistor via a second zener diode to the other one of the input lines and a base of the second transistor to the output, and a further diode connected to the other one of the input lines and via the resistor to said one input supply line.

13. A step down voltage AC to DC converter comprising:

first and second input voltage supply lines, a semiconductor switch element and a first capacitor connected in series circuit between said first and second supply lines, first and second dc output voltage terminal coupled to said first capacitor, and a sensing circuit responsive to an input voltage at the input supply lines for triggering the switch element to conduct only during a portion of the AC voltage below a predetermined voltage, said sensing circuit comprising;

a first resistor, a first zener diode and a first transistor connected in series between said first input supply line and a control electrode of the switch element, a second capacitor connected in parallel circuit with a series arrangement of a second zener diode and a second resistor, means connecting said parallel circuit between one main electrode of the first transistor and the first output terminal, means coupling a third zener diode to said first transistor one main electrode and to a control electrode of the first transistor, means coupling a first diode, a second transistor and a fourth zener diode in series between a second main electrode of the first transistor and said second input supply line, means connecting a control electrode of the second transistor to said first output terminal, means coupling a third transistor between the control electrode of the switch element and the first output terminal, and means connecting a control electrode of the third transistor to a junction between the second zener diode and the second resistor.

* * * * *

UNITED STATES PATENT AND TRADEMARK OFFICE
CERTIFICATE OF CORRECTION

PATENT NO. : 5,055,994
DATED : October 8, 1991
INVENTOR(S) : FRANCISCUS A.C.M. SCHOOFS It is certified that error appears in the above-identified patent and that said Letters Patent is hereby corrected as shown below:

Column 5, lines 35-38, delete in their entirety.

Column 6, line 38, change "terminal" to --terminals--.

Signed and Sealed this

Twenty-seventh Day of April, 1993

*Attest:*

MICHAEL K. KIRK

*Attesting Officer*  Acting Commissioner of Patents and Trademarks